US007984740B2

(12) United States Patent
Roche

(10) Patent No.: US 7,984,740 B2
(45) Date of Patent: Jul. 26, 2011

(54) FLEXIBLE MAGNETISED PORTION APPLICATOR DISPENSING APPARATUS AND METHOD

(76) Inventor: Glenn Roche, Notting Hill (AU)

(*) Notice: Subject to any disclaimer, the term of this patent is extended or adjusted under 35 U.S.C. 154(b) by 1013 days.

(21) Appl. No.: 11/577,223

(22) PCT Filed: Oct. 13, 2005

(86) PCT No.: PCT/AU2005/001583
§ 371 (c)(1),
(2), (4) Date: Apr. 13, 2007

(87) PCT Pub. No.: WO2006/039756
PCT Pub. Date: Apr. 20, 2006

(65) Prior Publication Data

US 2007/0215638 A1 Sep. 20, 2007

(30) Foreign Application Priority Data

Oct. 14, 2004 (AU) ................................ 2004905914

(51) Int. Cl.
*B29C 65/48* (2006.01)
*B32B 37/00* (2006.01)
*B32B 38/04* (2006.01)
*B32B 38/10* (2006.01)

(52) U.S. Cl. ....................................... 156/518; 156/520

(58) Field of Classification Search .................. 156/247, 156/249, 250, 251, 256, 261, 269, 350, 353, 156/367, 510, 515, 517, 518, 520
See application file for complete search history.

(56) References Cited

U.S. PATENT DOCUMENTS

| | | | | | |
|---|---|---|---|---|---|
| 3,670,612 | A | * | 6/1972 | Johnson et al. | 83/99 |
| 4,322,898 | A | * | 4/1982 | Bos | 37/326 |
| 4,385,959 | A | * | 5/1983 | Goguen | 156/506 |
| 4,543,862 | A | * | 10/1985 | Levene et al. | 83/19 |
| 4,652,331 | A | * | 3/1987 | Plasencia | 156/526 |
| 4,654,999 | A | * | 4/1987 | Raggett | 47/6 |
| 4,752,351 | A | * | 6/1988 | Lunt | 156/580.1 |
| 4,826,561 | A | * | 5/1989 | Carroll | 156/518 |
| 4,909,893 | A | * | 3/1990 | Lee | 156/513 |
| 5,055,155 | A | * | 10/1991 | Crotty et al. | 156/256 |
| 5,985,081 | A | * | 11/1999 | Reynolds | 156/271 |

(Continued)

FOREIGN PATENT DOCUMENTS

CA 1 234 346 3/1988

(Continued)

*Primary Examiner* — Philip C Tucker
*Assistant Examiner* — Sing P Chan
(74) *Attorney, Agent, or Firm* — Brooks Kushman P.C.

(57) ABSTRACT

A flexible magnetized portion applicator is disclosed. The apparatus applies a portion of flexible self-adhesive magnetized material (31) onto a card that is typically promotional in nature, for it to be held magnetically against a metal surface, via the method of pulling the magnetized material's adhesive release-coated backing paper (28) between rollers that grip the material (25) and (26), which when correctly rotated, draw suitably wide, adhesive-backed magnetized material (12) from a roll (13) into the apparatus (11) to project the material (28) over a stationary lower blade (18) and then cut a portion via a shear action (30) between a descending upper blade (19) mounted on a linear actuating ram (21) and the stationary lower blade (18), to then carry via the magnetism possessed within each portion (32) and press-apply (36) the self-adhesive portion of magnetised material (31) onto the upper-most card in a stack of cards (35) residing beneath the apparatus positioned to receive the said portion.

36 Claims, 2 Drawing Sheets

U.S. PATENT DOCUMENTS

| | | | | |
|---|---|---|---|---|
| 6,012,502 | A * | 1/2000 | VanNortwick et al. | 156/518 |
| 6,080,263 | A * | 6/2000 | Saito et al. | 156/253 |
| 6,281,044 | B1 * | 8/2001 | VanNortwick | 438/111 |
| 6,325,128 | B1 * | 12/2001 | Owen et al. | 156/518 |
| 6,543,510 | B1 * | 4/2003 | Prindiville | 156/517 |
| 6,568,449 | B2 * | 5/2003 | Owen et al. | 156/518 |
| 6,607,019 | B2 * | 8/2003 | Chapman | 156/433 |
| 6,623,592 | B1 * | 9/2003 | Chapman | 156/261 |
| 6,626,222 | B1 * | 9/2003 | VanNortwick | 156/518 |
| 6,749,711 | B2 * | 6/2004 | Prindiville | 156/247 |
| 6,858,109 | B2 * | 2/2005 | Wroblewski et al. | 156/264 |
| 6,883,574 | B2 * | 4/2005 | Chapman | 156/433 |
| 7,087,133 | B2 * | 8/2006 | Chapman | 156/261 |
| 2002/0007918 | A1 * | 1/2002 | Owen et al. | 156/518 |

FOREIGN PATENT DOCUMENTS

| | | |
|---|---|---|
| CN | 1279194 | 1/2001 |
| FR | 2806029 | 9/2001 |
| FR | 2806030 | 9/2001 |
| JP | 2003-256796 | 9/2003 |
| JP | 2005-178814 | 7/2005 |

* cited by examiner

FLEXIBLE MAGNETISED PORTION APPLICATOR DISPENSING APPARATUS AND METHOD

The provided invention is an apparatus to execute the method of cutting, dispensing and applying particularly a portion of flexible, adhesive-backed magnetised material to any item typically required to be magnetically held against a metal surface.

Most commonly an article to be magnetically held is made of light card, is promotional or novel in nature and the surface against which it is to be held is the exterior panelling of a refrigerator.

Other examples could include an instruction card being magnetically held against the panelling of a machine's safety enclosure or a card listing emergency telephone numbers being held against a common office filing cabinet, etc.

Typically and for reference hereinafter, the article to be applied with the magnetised material is a calendar promotional card and is to be fitted with a magnet portion.

Previously the application of the magnet portion is a manual, one-at-a-time procedure, requiring individuals to peel the pre die-cut magnet portion by hand from adhesive-release-coated backing paper and place the portion onto the promotional card in a consistently uniform and optimum position.

The group of individuals begin hand-applying the magnet portions at as brisk a rate as they can but soon tire to a slow, easily distracted pace due to the monotony of the task. This leads to inaccurate application of the magnet portion, possible rejection by the client of the production quantity that is inconsistent and prolonged boredom and repetitive strain injuries encountered by the individuals subjected to the task. Some businesses employed solely for the task, are contracted to apply magnet portions to promotional cards by hand and usually limit the quantity to be applied to 50,000. To apply this quantity by hand would take 62.5 hours by one person at the optimum, though intensive rate of 800 per hour, excluding packing for delivery.

The disclosed method permits an apparatus in its preferred embodiment to perform the task in less than 7.25 hours at approximately 7000 per hour, delayed only by periodic operator attention to replenish the promotional cards stacked beneath the apparatus and rolls of flexible magnetised material to be consumed, upon the apparatus. Over a daily work time average of 7.5 hours, the difference is 8.3 days to 1 day, a saving of approximately 7.3 days. This lesser time also includes box packing of the processed stock ready for delivery.

More recently a rate of 8100 magnet portions dispensed and applied per hour, was attained when the disclosed apparatus was approximated to, and its function was triggered by, the pick up and pass through paper transport means of a typical printing machine, increased to its maximum speed.

Previously for an individual, the manual handling of the magnet portion after peeling the flexible magnet portion upward from the adhesive release-coated backing paper, requires, if only miniature in actuality, separating the adhesive gum by stretching it until breaking away from the subsequent portions, holding the magnet portion over the card on which it is to be adhered and pressing it down onto the card to engage the adhesive. If automated however, the handling of the portion presents problems due to one side of the portion being magnetic and one side being coated minutely with stretching and stringy adhesive gum.

Liken the process and materials to that of mozzarella cheese, melting back together on a pizza after it has been cut.

To lift a slice of pizza one has to gauge how fast it can be removed via tension, vision and feel, to stretch and tear the cheese until separated free from subsequent slices.

Similarly, the varying resistance in adhesive thickness or viscosity and magnet portion position, has encouraged only human touch and judgment over that of a machine, to separate each portion from various quantity-diminishing locations remaining on a sheet of die-cut magnet portions.

It is known that adhesive labels are applied to cartons or packaging via roller pressure application devices which require 'distance-increment sensing' so as not to roll two labels onto a package. This also requires that the labels be pre-cut, with space between each label to suit incremental delivery from the device or the addition of further cutting mechanisms.

It is also known that these devices may employ a descending, air-suction-equipped ram, to reach and place a label on to different size and height cartons typically travelling on a conveyor belt underneath the device. Neither roller pressure, air suction nor incremental delivery of pre cut magnet portions solve the problems inherent in the dispensing and application of said portions due to the dual-sided, adhesive and magnetic behaviour anomalies of each portion.

To most efficiently automate the task, the disclosed apparatus executes the method of cutting and placing the magnet portion onto typically a promotional card, when approximated for use above a stack of said cards residing in the feeding tray of a typical printing machine or similarly operative paper feeding apparatus.

The magnet portion applied upper-most card in the stack can be removed via the printing machine's pick up and pass through operation typically suited to processing stacked quantities of paper or card. The magnet portion is applied by the disclosed apparatus prior to the card being transported through the printing machine and out in to a typical collection chute.

The increased speed of magnet portion application and subsequent mechanical transport of the portion applied card is most efficiently obtained when the two operative mechanisms are synchronised.

Manually however, having mechanically cut and placed a magnet portion via a lever or foot pedal of a manually operated embodiment of the invention, it is the speed in which a person can remove by hand, the uppermost-card in a stack that ultimately decides the speed of the process.

The first 45,000 portions of magnetised material dispensed and applied automatically on three occasions of 10,000, 15,000 and 20,000 respectively yielded high speed and repetitive consistency directly attained via the disclosed cutting and placing application method of the provided invention.

The end product, being typically a promotional card with a mechanically applied magnet portion, is recognisable by magnet portion size and placement accuracy and is regarded as a value-added, professional example for the commissioning client due to the consistency attained via the method by which the magnet was applied and the high speed, low duration processing of the magnet-applied card quantity.

It is therefore an objective of the disclosed invention, to provide a suitable means for the mechanical, either manually initiated or automated application, of a portion of particularly self adhesive magnetised material via first advancing the material with one movement, then cutting and placing of the portion in a second single movement, onto typically light card or other articles.

The provided invention method requires that the magnetised material stock be supplied to the disclosed apparatus from a continuous roll.

The roll is supplied to the consumer cut to an average 37 mm width and can be cut to any width to suit the consumer. The apparatus via adjustment can dispense average and extended lengths also. For example hereinafter, all operational reference is made to the average width and length. The apparatus once triggered if automated or turn-knob revolved if operated manually, draws the stock from the roll which is mounted on a hub and axle allowing it to unroll as required.

After the material is fed to the apparatus from a roll, the method of the provided invention exploits the flexible, cutable properties of the vinyl-like magnetised material substrate to execute the application of the portion.

It achieves this by advancing the magnetised material from the roll into the apparatus and cutting the desired portion, employing the magnetism possessed within each portion to carry it after cutting and by the continued downward movement remaining from the cutting of the portion being halted upon contact, applies pressure, through the adhesive downward facing magnet portion to engage the adhesive, to typically the top card in a stack of promo cards residing beneath the apparatus.

An apparatus, to execute the method of the provided invention could employ manual, mechanical, electric, hydraulic or pneumatic components or a combination of all for its moving parts. For cleanliness of operation it is possible but not desirable to employ hydraulics for any driven component of the apparatus. For reference hereinafter, the operable components of the apparatus are rotational and linear actuators.

The disclosed method requires that an apparatus in its preferred embodiment employs two moving parts to operate, one has a rotational movement to manage the drawing of the material from the roll and advance the magnetised material into the apparatus and the other has a linear movement set vertically, to downwardly cut and subsequently place the magnet portion. The apparatus can work on any angle and could also be inverted to approximate it for use, near a bottom sheet removing, paper transport device to dispense a magnet portion upward onto the lower surface of a card or paper sheet if necessary.

Being possibly pneumatic or electric, each requires a management circuit to ensure each actuator functions in sequence. Or if manual in operation, the apparatus operator coordinates a rotational movement with a linear movement. Each movement can be initiated by either hand, or a foot pedal and appropriate turn knobs and linkages. Whether manual or automated, for example hereinafter, either means employs substantially similar rotational or downward linear actions.

In function, the apparatus in its preferred embodiment, exploits the strength of the magnetised material's adhesive release-coated backing paper, to draw the material off of the roll and into the apparatus by pulling only the backing paper. Alternatively, sandwiching rollers or belts may push the material with a stripper blade appropriated to separate and guide away the adhesive backing paper.

In the preferred embodiment of the invention the flexible magnetised stock strip is fed into a guide channel for orientation that is twisted along its length to give a slight angle of approximately 20 degrees from horizontal.

The angle delivers the magnetised material over a fixed lower shear blade, mounted upon the apparatus at the same angle. The angle creates a shear action between the fixed lower blade and a flat horizontal plate, the edge of which acts as an upper shear blade, that is attached to the lower end of a linear actuated ram mounted vertically above and offset from the lower blade. Substantially the operative function is that of an inverted guillotine.

At the exit end of the guide channel (opposite to the end being fed from the roll) the magnetised material is separated from its adhesive backing paper. The paper is peeled downward and pulled back on an angle under the guide channel from which it has traveled and is then fed between a drive roller and a pinch roller, both of which preferably being rubber-coated to create a sandwiching grip upon the backing paper. When the drive roller is actuated, it pulls the paper between it and the pinch roller and as a result the magnetised material is drawn from the roll and along the guide channel, the required distance of which can be achieved by intermittent rotation of the drive roller, resulting in incremental material advancement, or by the material hitting an adjustable stop.

As the backing paper is being drawn downward, the resiliently self-supporting magnetised material is projected outward from the supporting guide channel for the required distance and over the lower shear blade. The material is then cut in a descending shearing motion by the edge of the horizontal plate that forms the upper shear blade attached to the lower end of the linear actuator ram. At this point the magnet portion is held by its own magnetism, up to, under and flat against the descending horizontal plate shear blade.

The card stock to which the magnet portion is to be applied resides in a stack formation beneath the descending ram of the vertical actuator. The magnet portion carrying, descending vertical actuator ram, provides temporary pressure upon contacting the uppermost card in the stack, before a pressure-increase or a pressure-decrease sensing valve or switch, reverses the travel of the linear actuator ram which ascends away from the now magnet portion applied, upper-most card in the stack.

The magnet portion has enough magnetism to hold itself and the card against the ascending blade should it ascend slowly but it is held down by surrounding air pressure if the ram-mounted blade ascends quickly, or, a simple bracket foot can hold the portion-applied card down which easily overcomes the ascending magnetic hold. Upon full ascent of the linear actuator ram the apparatus is now at rest and ready to repeat the process.

Should the automated apparatus be initiated and actuated electronically, an array of timers, proximity sensors, solenoids or limit switches would be incorporated in a typical governing circuit and if the apparatus were pneumatic, an array of typical air manifolds, switches and valves would be incorporated to initiate and govern its progress.

A combination of pneumatic and electric control offers convenience in as much as counters, speed control or stopping at desired quantities are afforded, though not essential for the mechanical dispensing duty that the method requires of an apparatus. Hand winding a turn knob, to advance the magnetised material beneath a descending blade which is then lowered via a connected foot pedal to cut and place the portion, are suitable means by which the provided invention method can be initiated in a manually operated apparatus embodiment of the invention also.

The driven advancement of the magnetised material is most efficiently derived from a rotational action. If an electric motor is incorporated into the process of the apparatus it may rotate the drive roller with intermittent forward rotation. If it were pneumatic, it could be driven by a reciprocating movement rotary actuator, this would require a forward-driving, free-reversing clutch bearing, be incorporated onto the drive roller to allow resetting of the actuator without reverse-rotating the drive roller.

Transmission of movement between driving and driven components may be via belts, chains, rack and pinion or shafts configured where most appropriate to give silent, increment detectable, discrete or economic availability convenience option to its assembly.

Substantially, the disclosed invention method requires the apparatus in the disclosed apparatus embodiment perform two motions, the formality of initiating those motions can be achieved in other embodiments via an abundance of typically available components and is therefore not limited to the disclosed or illustrated embodiment.

Any suitable material able to be drawn or advanced into the apparatus, stripped if necessary of support webbing, cut by the disclosed shearing or cropping function, carried and applied or positioned by way of means other than magnetism, may be introduced to the apparatus to be dispensed and placed via the disclosed method and operational attributes of the provided invention also.

The provided invention method of advancing, typically though not limited to, flexible magnetised material, between two blades with one movement to then dispense, carry and apply the resulting portion with a second movement, can be performed by an automatic or manually initiated apparatus, either of which can be assembled with present manufacturing techniques.

In order for the invention to be readily understood, a particular embodiment thereof will now be described by way of example only with reference to the accompanying drawings.

Figure 1:
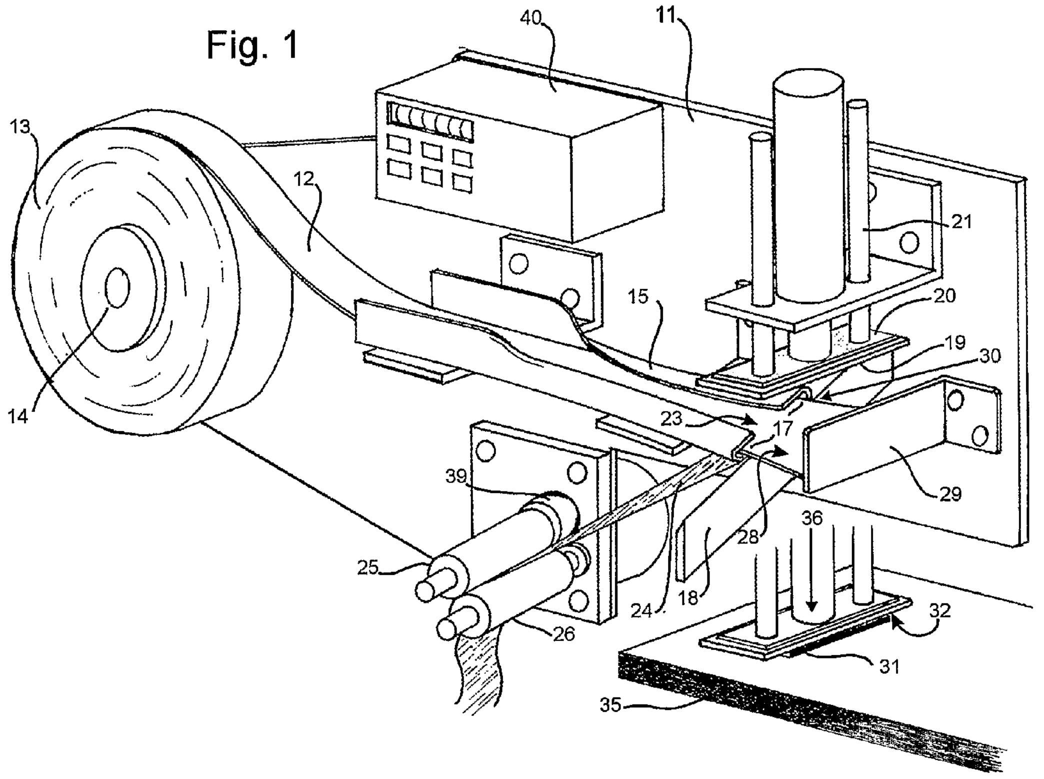
FIG. 1 Is a perspective view of a magnet portion application apparatus.
Figure 2:
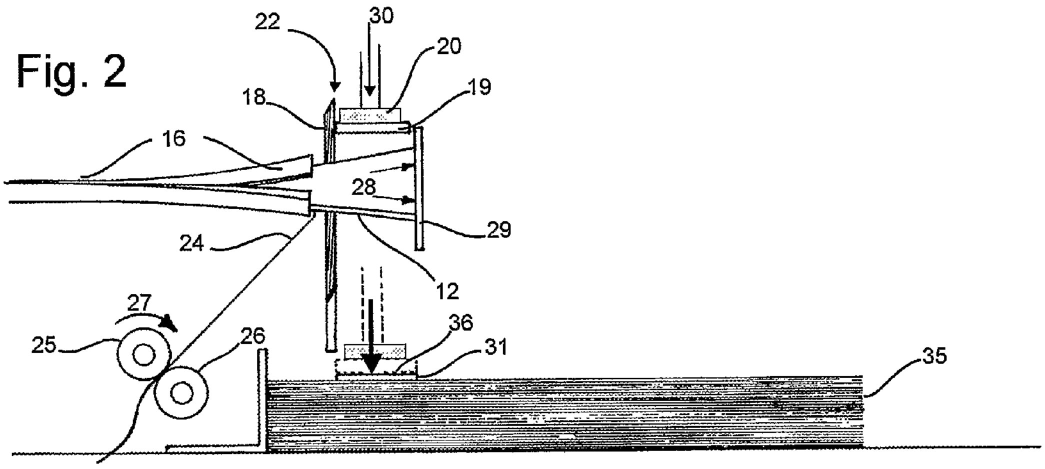
FIG. 2 Shows an illustrated plan view of the magnet portion application method.
Figure 3:
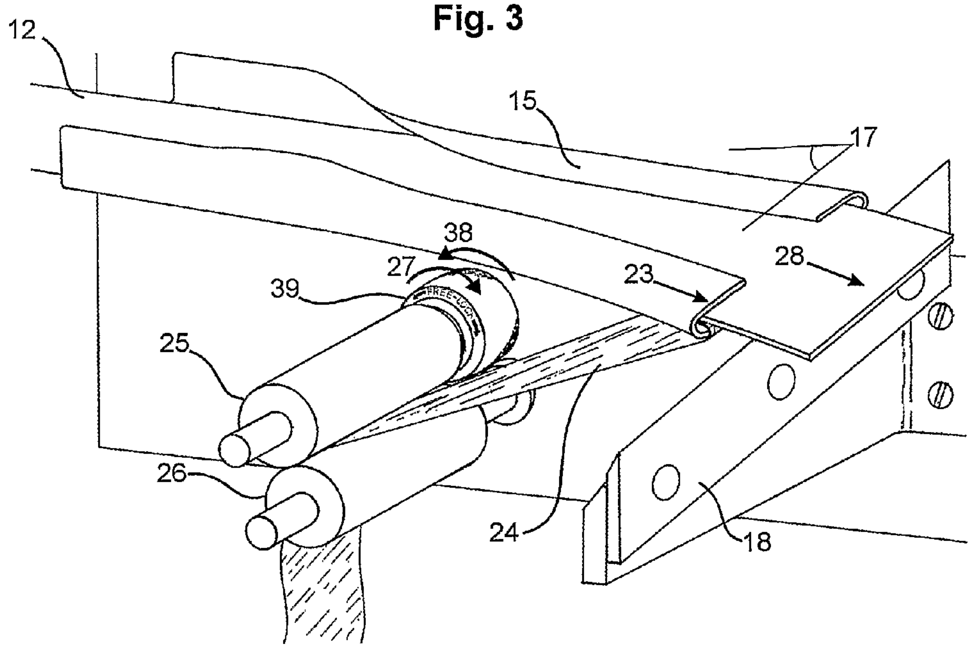
FIG. 3 Shows perspective view of drive and pinch rollers with the magnetised material's adhesive release-coated backing paper between them.
Figure 4:
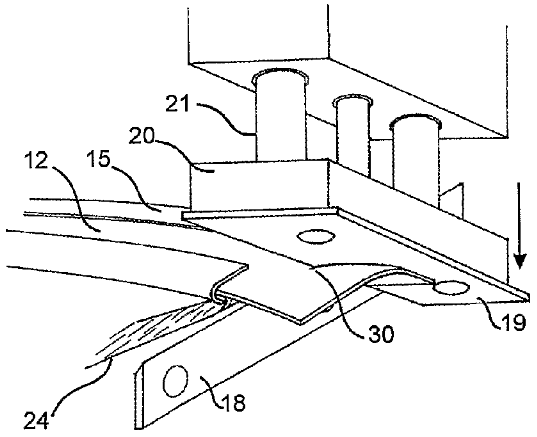
FIG. 4 Shows flexible magnetised material projecting from the feeding guide channel and blades with partially cut magnetised material between them.
Figure 5:
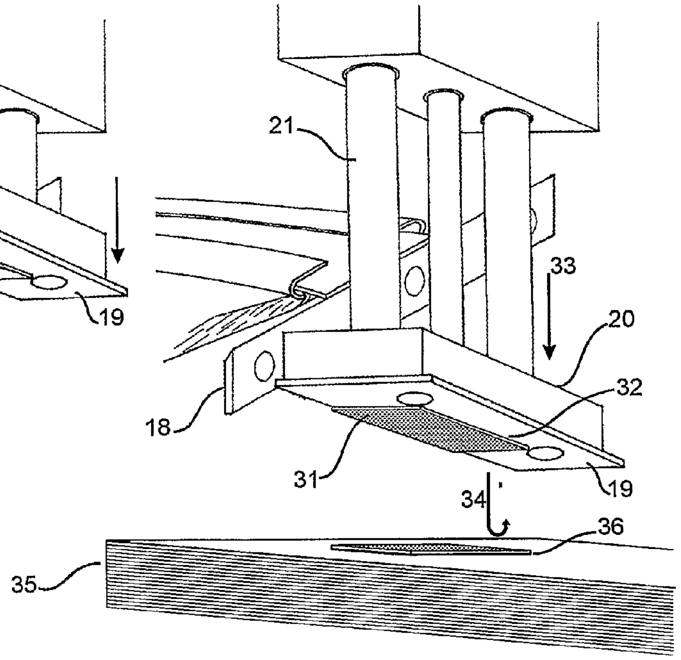
FIG. 5 Shows horizontal flat plate blade attached linear actuator ram vertically descending to place magnet portion onto top card of stack residing beneath the apparatus.

The flexible magnet portion applicator 11 consisting of a suitable frame on which to mount operable components and a reserve of material, cuts, carries and places a portion of flexible, self adhesive magnetised material onto the upper most card in a stack of promotional cards or card-like materials residing underneath the vertically descending portion application ram of the apparatus.

The apparatus once initiated, draws the magnetised material stock 12 off of the roll 13 which is mounted on a hub and axle 14 allowing it to unroll as required. After it is fed to the apparatus from the roll 13 the magnetised material stock is drawn into a guide channel 15 for orientation that is twisted along its length 16 to give a slight angle of approximately 20 degrees from horizontal 17. The angle 17 creates a shear action between a fixed lower blade 18 and a flat horizontal plate 19 the edge of which acts as an upper shear blade that is attached to a tool plate 20 at the lower end of a linear actuator ram 21 mounted vertically above and offset 22 from the lower blade 18.

At the exit end 23 of the guide channel 15 the magnetised material 12 is separated from its adhesive backing paper 24. The paper 24 is peeled downward and pulled back on an angle under the guide channel 15 from which it has traveled and fed between a drive roller 25 and a pinch roller 26. When the drive roller 25 is actuated by rotation, 27 it pulls the paper between it and the pinch roller 26 and as a result, the magnetised material 12 is drawn from the roll 13 and advanced along the guide channel 15. The magnetised material 12 is resilient enough to be self supporting and by being advanced intermittently or by hitting a stop, 29 is projected outward 28 from the supporting guide channel 15 for the required distance and over the lower shear blade 18. It is then cut by the edge of the said horizontal plate above 19 that forms the upper shear blade in a descending shearing motion, 30 through the flexible magnetic material 12. The apparatus exploits the strength of the magnetic material's adhesive backing paper, 24 to draw the material 12 off of the roll 13 and into the apparatus by pulling only the backing paper 24. After cutting the required portion 31 from the roll 13 the apparatus employs the magnetism possessed within each cut portion 32 to carry it after cutting and by the continued downward movement 33 remaining from the cutting of the portion 32 places and applies pressure 34 through the adhesive downward facing magnet portion 31 onto the promo card stock 35 to engage the adhesive. The travel of the linear actuator ram, 21 reverses 34 to ascend away from the now magnet portion applied uppermost card in the stack 36. Upon full ascent of the linear actuator ram 21 the apparatus is now reset and ready to repeat the process. The drive roller 25 if driven via a reciprocating forward and back movement rotary actuator, requires a forward-driving 27 free-reversing 38 clutch bearing 39 be incorporated onto the drive roller 25 to allow resetting of the actuator without reverse-rotating the drive roller. A typical pneumatic, electric or combination management circuit, 40 may be housed upon the mounting frame of the apparatus 11 to coordinate its moving components.

The invention claimed is:

1. An apparatus for dispensing feedstock of flexible adhesive backed magnetic material and backing paper and applying the magnetized material to pieces of cardstock, the apparatus comprising:

- a dispenser for supporting and dispensing the feedstock;
- a guide channel which receives the feedstock for orienting the feedstock, the backing paper being peeled from the magnetic material at an end of the guide channel, wherein, the guide channel is angled so that the guide channel orients the feedstock with a twist along the longitudinal direction;
- a drive mechanism to draw magnetized material through the guide channel and out to a cutting area; and
- a shearing device for forming cut portions of the magnetized material, the shearing device including a linear actuator ram and at least one blade,
- wherein the actuator ram activated, the at least one shear the adhesive backed magnetized material to form a cut portion of a required length, the cut portion subsequently carried by actuator ram so that the cut portion is placed on the piece of card with the adhesive facing towards the piece of cardstock so that pressure from the actuator ram applies the adhesive backed magnetic material to the cardstock.

2. An apparatus according to claim 1 wherein the at least one blade is angled to correspond to the angle of the guide channel.

3. An apparatus according to claim 2 wherein the guide channel is angled with at least 20 degree angle from horizontal.

4. An apparatus according to claim 1 wherein whereby the drive mechanism is a take-up roller which the backing paper is fastened to so that rotation of the take-up roller drives pulls the backing paper and drives the feedstock.

5. An apparatus according to claim 1 whereby the cut portion of magnetized material is magnetically attracted to an upper horizontal plate in the shearing device so that after cutting of each cut portion the upper horizontal plate then carries the cut portion via the magnetism.

6. An apparatus according to claim 1 wherein the drive mechanism further includes a drive roller and a pinch roller whereby the backing paper is sandwiched between the drive and pinch rollers so that the drive and pinch rollers pull upon the backing paper when at least one of the drive and pinch rollers is rotated.

7. An apparatus according to claim 1 whereby the magnetized material is drawn along guide channel by the backing paper being separated and pulled downward from the end of said channel, the magnetized material thereby being projected in a straight outward path from the guide channel.

8. An apparatus according to claim 1 wherein the magnetized material is projected in a straight outward path from the guide channel to a stop portion, the stop portion positioned a distance from the guide channel in order to measure the required length of the cut portion.

9. An apparatus according to claim 1 wherein the dispenser includes a hub, upon which a roll of flexible feedstock is placed and from which the feedstock is unrolled, the hub being powered, to actively unroll the feedstock.

10. An apparatus according to claim 1 wherein the dispenser includes a hub upon which a roll of flexible feedstock is placed whereupon the roll of flexible feedstock is elevated and by which gravity is employed to influence the introduction of the feedstock into the guide channel of the apparatus.

11. An apparatus for dispensing feedstock of flexible adhesive backed magnetic material and backing paper and applying the magnetized material to pieces of cardstock, the apparatus comprising:

a dispenser for supporting and dispensing the feedstock;

a guide channel which receives the feedstock for orienting the feedstock, the backing paper being peeled from the magnetic material at an end of the guide channel;

a drive mechanism to draw magnetized material through the guide channel and out to a cutting area; and a shearing device for forming cut portions of the magnetized material, the shearing device including a linear actuator ram and at least one blade, wherein the at least one blade is a fixed lower shear blade wherein the angle of the fixed lower shear blade may be set at an angle to optimize the cutting of the magnetize material, wherein the actuator ram activated, the at least one shear the adhesive backed magnetized material to form a cut portion of a required length, the cut portion subsequently carried by actuator ram so that the cut portion is placed on the piece of card with the adhesive facing towards the piece of cardstock so that pressure from the actuator ram applies the adhesive backed magnetic material to the cardstock.

12. An apparatus according to claim 11 whereby operation of at least one of the drive mechanism and the actuator ram is an automated process so that the functions of feeding and cutting the magnetized material are automatically performed.

13. An apparatus according to claim 12 whereby the functions of feeding and cutting the magnetized material are automatically performed by at least one of pneumatic actuators, electric actuators, solenoids and hydraulic actuators incorporated upon the apparatus.

14. An apparatus according to claim 12 whereby the automated process includes at least one of a pneumatic management circuit comprising of valves, manifolds, pressure sensing valves or an electric management circuit comprising of switches, proximity sensors, timers and speed controllers or a hydraulic management circuit comprising of valves, manifolds to coordinate the drive mechanism and the actuator ram.

15. An apparatus according to claim 12 whereby the automated process management is initiated via at least one of a trip switch, cam and cam follower switch, a press button or foot switch that is located away from the apparatus or attached to and triggered remotely by, other apparatus or an operator.

16. An apparatus according to claim 11 whereby the backing paper is directed between the a drive roller and a pinch roller that sandwich and then pull upon the backing paper via the correct rotation of the drive roller.

17. An apparatus according to claim 16 whereby the backing paper is gripped and pulled between drive and pinch rollers that are rubber or soft polymer coated.

18. An apparatus according to claim 16 whereby the drive mechanism is driven by a reciprocating, forward and back movement rotary actuator, and includes a forward-driving, free-reversing clutch bearing upon the drive roller, to allow resetting of the rotary actuator without reverse-rotating the drive roller.

19. An apparatus according to claim 11 whereby the feedstock is drawn into the apparatus via a reciprocating linear mechanism that pulls or pushes at least one of the magnetized material or the backing paper.

20. An apparatus according to claim 11 whereby the feedstock may be advanced by being sandwiched between at least one of the rollers and belts and the backing paper is subsequently stripped from the adhesive backed magnetic material by a suitably approximated blade.

21. An apparatus according to claim 11 whereby the magnetized material is drawn along the guide channel by the backing paper being separated and pulled downward from the end of said channel, the magnetized material thereby being projected in a straight outward path from the guide channel.

22. An apparatus according to claim 21 whereby when the magnetized material is projected in a straight outward path from the guide channel, the magnetized material is projected over the fixed lower blade.

23. An apparatus according to claim 11 further comprising an upper horizontal plate attached to a lower end of the actuator ram whereby the cut portion of magnetized material is magnetically attracted to the upper horizontal plate so that after cutting of each cut portion the upper horizontal plate then carries the cut portion via the magnetism.

24. An apparatus according to claim 23 whereby the upper horizontal plate includes at least one of an incorporated clip, groove or ledge, to transport the cut portion during the process.

25. An apparatus according to claim 23 whereby the upper horizontal plate includes a suction means and at least one of air suction cups and suction ports incorporated within the actuator ram and the upper horizontal plate.

26. An apparatus according to claim 11 whereby the apparatus is located for use above a paper feeding tray via a connectedly attached supporting arm or free standing floor stand.

27. An apparatus according to claim 11 whereby operation is disabled by opening or removing enclosures or guards.

28. An apparatus according to claim 11 which further comprises magnetically attractive guide tracks to support the magnetized material projected from the feeding guide channel and to assist long and straight feeding when the resilience of the magnetized material is insufficient to be self supporting of greater lengths.

29. An apparatus according to claim 11 which further comprises extended magnetically attractive horizontal plate blade to support magnetized material projected from the guide channel before and after cutting.

30. An apparatus according to claim 11 whereby the functions of feeding or cutting of flexible magnetized material are performed by pneumatic or electric, rotational or linear actuators or solenoids.

31. An apparatus according to claim 11 wherein the dispenser includes a hub, upon which a roll of flexible feedstock is placed and from which the feedstock is unrolled, the hub being powered, to actively unroll the feedstock.

32. An apparatus according to claim 11 wherein the dispenser includes a hub upon which a roll of flexible feedstock is placed whereupon the roll of flexible feedstock is elevated and by which gravity is employed to influence the introduction of the feedstock into the guide channel of the apparatus.

33. An apparatus according to claim 11 wherein the drive mechanism and actuator ram are operated manually and initiated by an operator using a mechanical interface.

34. An apparatus according to claim 11 whereby the lower blade is formed of substantially harder material than the magnetized material.

35. An apparatus according to claim 11 wherein the lower shear blade is angled at 20 degrees.

36. An apparatus for dispensing feedstock of flexible adhesive backed magnetic material and backing paper and applying the magnetized material to pieces of cardstock, the apparatus comprising:

a dispenser for supporting and dispensing the feedstock;

a guide channel which receives the feedstock for orienting the feedstock, the backing paper being peeled from the magnetic material at an end of the guide channel;

a drive mechanism to draw magnetized material through the guide channel and out to a cutting area; and a shearing device for forming cut portions of the magnetized material, the shearing device including a linear actuator ram and at least one blade, whereby the cutting of each cut portion of magnetized material from a continuous roll is permitted via a shear action between a fixed blade and a moving blade of the apparatus that can both be set to out laterally or on a given angle, wherein the actuator ram activated, the at least one shear the adhesive backed magnetized material to form a cut portion of a required length, the cut portion subsequently carried by actuator ram so that the out portion is placed on the piece of card with the adhesive facing towards the piece of cardstock on that pressure from the actuator ram applies the adhesive backed magnetic material to the cardstock.

* * * * *